United States Patent
Saltel

(10) Patent No.: US 8,302,633 B2
(45) Date of Patent: Nov. 6, 2012

(54) FLEXIBLE PIPE HAVING INTEGRATED END FITTINGS

(75) Inventor: Jean-Louis Saltel, Le Rheu (FR)

(73) Assignee: Saltel Industries (FR)

( * ) Notice: Subject to any disclaimer, the term of this patent is extended or adjusted under 35 U.S.C. 154(b) by 630 days.

(21) Appl. No.: 12/226,098

(22) PCT Filed: Jun. 14, 2006

(86) PCT No.: PCT/EP2006/063223
§ 371 (c)(1),
(2), (4) Date: Jul. 20, 2009

(87) PCT Pub. No.: WO2007/112785
PCT Pub. Date: Oct. 11, 2007

(65) Prior Publication Data
US 2009/0309356 A1 Dec. 17, 2009

(30) Foreign Application Priority Data
Apr. 6, 2006 (FR) .................................... 06 03048

(51) Int. Cl.
*F16L 11/00* (2006.01)
(52) U.S. Cl. ........ 138/109; 138/129; 138/130; 138/134; 285/222.4; 285/222.2; 285/368
(58) Field of Classification Search .................. 138/109, 138/129, 130, 134, 135; 285/222.4, 222.2, 285/368
See application file for complete search history.

(56) References Cited

U.S. PATENT DOCUMENTS

| | | | | |
|---|---|---|---|---|
| 3,232,640 A | * | 2/1966 | Donkle, Jr. | 285/93 |
| 4,033,612 A | | 7/1977 | Chevalier | |
| 4,126,157 A | * | 11/1978 | Roest | 138/109 |
| 5,288,109 A | * | 2/1994 | Auberon et al. | 285/222.4 |

FOREIGN PATENT DOCUMENTS

| | | |
|---|---|---|
| WO | 9919655 A1 | 4/1999 |
| WO | 2004051131 A1 | 6/2004 |

OTHER PUBLICATIONS

International Search Report for Application No. PCT/EP2006/063223 dated Dec. 13, 2006.

* cited by examiner

*Primary Examiner* — Patrick F Brinson
(74) *Attorney, Agent, or Firm* — Lerner, David, Littenberg, Krumholz & Mentlik, LLP

(57) ABSTRACT

A flexible pipe comprising a flexible cylindrical tubular pipe body connected at each of its ends to a rigid connector end fitting in the form of a sleeve. The wall of the pipe body is mechanically reinforced by at least one traction layer of filaments of small thickness, presenting high traction strength, that are wound helically about the longitudinal axis of the pipe. The traction layer is composed of an array of uninterrupted filaments interconnecting the two end fittings alternately in one direction and then in the other direction, while being fastened on the end fittings.

12 Claims, 3 Drawing Sheets

FLEXIBLE PIPE HAVING INTEGRATED END FITTINGS

CROSS-REFERENCE TO RELATED APPLICATIONS

The present application is a national phase entry under 35 U.S.C. §371 of International Appln. No. PCT/EP2006/063223 filed Jun. 14, 2006, and claims priority from French Patent Appln. No. 06/03048, filed Apr. 6, 2006, the disclosures of which are hereby incorporated herein by reference.

BACKGROUND OF THE INVENTION

The present invention relates to a flexible pipe, and more particularly to a flexible pipe having integrated end fittings. Its structure is particularly, but not necessarily, adapted to an application in the oil industry for transporting liquids or gases.

Such flexible pipes are generally relatively short, being of a length that rarely exceeds about a dozen meters, and they enable flexible connections to be made between fixed pieces of equipment. When lengths longer than the available lengths are needed, then a plurality of flexible pipes can be connected together.

These flexible pipes, in particular in an oil industry environment, can be subjected to very high levels of stress. The pressure of the effluents they transport can exceed 1000 bars (i.e. 100 megapascals (MPa)) and their temperature can exceed 150° C. The effluents may be constituted by liquids or gases that can be highly corrosive, such as oil, aromatic liquids, water, hydrogen sulfide ($H_2S$), or carbon dioxide gas ($CO_2$). Such pipes can be subjected to a wide variety of external stresses, including in particular traction on their ends during assembly, exposure to temperatures that can lie in the range −40° C. to +70° C., and abrasion against the ground.

Their lifetime is variable depending on the application to which they are put, but in general it should be greater than 10 years, and by construction they must be capable of guaranteeing safety for personnel and equipment. They must be light in weight in order to facilitate transport and handling. They must be fitted with protection means for avoiding damage that would be created by a radius of curvature that is too small.

In the description below, the term "flexible pipe" designates an assembly made up of a "pipe body" (supple cylindrical tubular main portion) together with two connector end fittings, one being fitted to each of the ends of said main portion. In cross-section, the pipe body is generally constituted, going from the inside towards the outside, by a "carcass," a "liner," optionally a "drainage layer," a "reinforcement layer," optionally one or more "traction layers," and an outer "cover."

The carcass is generally constituted by a shaped metal strip fastened to form a continuous cylinder. Its function is to prevent bubbles forming in the liner in the event of sudden decompression (the so-called "blistering" phenomenon). In addition, it serves to avoid the pipe body collapsing when an external pressure is applied that is greater than the internal pressure. Finally, it serves to absorb the axial loads applied to the pipe by preventing its diameter decreasing, and thus preventing the pipe body from being damaged. This carcass must be sufficiently supple to ensure that the pipe has the required degree of flexibility.

The "liner" is generally made of thermoplastic material or of elastomer. Its function is to provide gas- and liquid-tightness from the inside to the outside and ensures internal fluid integrity. This layer must have a small swelling coefficient (generally less than 10%), and also low permeability.

Where it exists, the "drainage layer" serves to drain any gas that diffuses through the liner to vents that are situated at the end fittings of the flexible pipe. They thus serve to avoid any blisters or bubbles forming in the outer protective sheath.

The "reinforcement layer" withstands the pressure developed by the fluid on the liner, and is generally constituted by a helical winding of one or more crossed layers.

These layers may either present a pitch that is short (i.e. a winding angle relative to the axis of the pipe that is close to 90°), or else a pitch that is long, being close to the equilibrium value for the structure when it is subjected to internal pressure, namely 54.7°.

The "traction layer(s)," where present (often in the form of two crossed sheets), is/are generally constituted by helically winding reinforcement that is wound at a long pitch with a winding angle relative to the axis of the pipe that lies in the range of 20° to 50°, serving to take up the axial forces exerted on the pipe. These layers may be situated inside or outside the reinforcement layer.

The outer protective cover is made of thermoplastic material or of elastomer. Its function is to protect the pipe from external attack (water or salty conditions, for example).

It should be observed that a distinction is drawn between two categories of flexible pipe, those that are said to be "bonded" in which the various above-mentioned layers are bonded to one another, and those that are "not bonded" in which the various layers are independent.

The subject matter of the present invention is more particularly suited to bonded flexible pipes, however it can also apply to non-bonded pipes.

The end fittings serve to enable the pipe to be connected to various pieces of equipment. They are subjected to high levels of stress, and they must present mechanical strength that is not less than that of the pipe body.

The pipe body may be manufactured in great lengths using a continuous fabrication process, relying mainly on thermoplastics, or in shorter lengths, generally of 6 meters (m) to 12 m, using a method of manufacture on a support rod and often requiring vulcanization, relying mainly on elastomers as their materials.

Very generally, for all these types of flexible pipe, the winding pitch of the traction layers is identical over the entire length of the pipe and the end fittings are assembled thereto after the pipe body has been fabricated. In order to make such flexible pipes, it is therefore necessary initially to cut the pipe body to the desired length, and then to secure the end fittings thereto.

It should be observed that at the connection between the pipe body and an end fitting, there is an interruption in the reinforcement layer and in the traction layers. It is therefore necessary to connect them to the end fittings using suitable mechanical connection methods, e.g. by crimping, wedging, and/or adhesive bonding, suitable for passing stresses from the pipe body to the structure of the end fittings.

In addition, it is necessary to make leak-tight connections between the end fittings and the liner of the pipe. These connections are particularly important since perfect leak-tightness must be maintained throughout the lifetime of the flexible pipe. Unfortunately, these connections must naturally withstand the same stresses as are withstood by the main pipe body, in particular in terms of pressure and temperature.

It will be understood that making such end fittings is difficult and their design raises serious difficulties, associated firstly with the magnitude of the mechanical forces involved, and secondly with the problem of maintaining sealing. The traction force generated by the internal pressure can be very high. By way of indication, it can reach a value of the order of 55,000 decanewtons (daN) for a pipe having a diameter of 100 millimeters (mm) and that is subjected to an internal pressure of 700 bars. To this force, it is necessary to add traction forces that depend on the application (mounting a suspended pipe, for example). Extremely high levels of stress are thus applied to the system for retaining the traction layers (often cables or metal section members) on the end fittings. The retention system must thus be very reliable, and must be capable of being subjected to a very large number of loading and unloading cycles (several million cycles) without damage.

With reference to sealing, this is achieved by the liner pressing against the reinforcement layer, and the leak-tight connection with the end is very often achieved by adhesive or by pinching. To maintain sealing, it is therefore necessary for the adhesive or the elasticity of the liner (for maintaining the pinching force) to continue throughout the lifetime of the pipe. End fittings suitable for satisfying these conditions are heavy and they often need to be assembled manually, with the help of appropriate mechanical means that are expensive.

SUMMARY OF THE INVENTION

An object of the present invention, therefore, is to provide a flexible pipe of the above-described kind, that is lighter in weight and stronger than a traditional flexible pipe, with end fittings that form integral portions in the fabrication of the pipe body. The pipe may further include the reinforcement layer, and the layers being made up of an array of uninterrupted yarns or cables that are wound around each of the ends. These yarns or cables may possibly present a pitch that varies and serve to ensure at the same time leak-tightness relative to the liner and mechanical fastening upon the end fittings.

In FIG. 1, a segment of conventional flexible pipe, the top half view being in axial section and the bottom half view being a "cutaway" view of the pipe. References a, b, c, and d therein designate respectively the carcass, the liner, the reinforcement layer (constituted in this case by two superposed layers of filaments), and the outer protective cover. This diagram does not show the drainage layer (which would be situated between the layers a and b), nor does it show the traction layer.

In the description below, and also in the claims, the generic term "filament" is used conventionally to designate equally well a cable, a yarn, a roving, a fiber or a nanometric fiber. These terms are used as follows:

A "fiber is an individual cylindrical formation of very small diameter, generally of synthetic, organic, or steel material, and usually in association with other fibers to form a yarn or roving; this term "fiber" also includes the term "nanometric fiber", the fibers being then composed of a plurality of nanofibers, for example carbon nanotubes, each having a diameter of nanometer order, i.e. $10^{-6}$ mm;

A "roving" is a long strand of small section constituted by parallel fibers;

A "yarn" is a long strand of small diameter constituted by a plurality of fibers that have been twisted and spun together; and A "cable" is a bundle of synthetic or steel material yarns that have been braided together.

The flexible pipe constituting the subject matter of the present invention comprises a flexible pipe body connected at each of its ends to a rigid connector end fitting in the form of a sleeve, the wall of the pipe body being mechanically reinforced by at least one layer of filaments of small thickness presenting high traction strength that are wound helically about the longitudinal axis of the pipe.

The objects of the invention, as outlined above, are achieved by the facts that said layer comprises an array of uninterrupted filaments interconnecting the two end fittings alternately in one direction and then in the other direction, while being fastened on said end fittings. By means of this arrangement, the end fittings are integrated in the structure of the pipe body, and the pipe is capable of withstanding very high traction forces.

In addition, according to a certain number of features of the invention that are advantageous, but not limiting:

Said filaments are fastened on the end fittings by means of mechanical lashing members provided at their peripheries and approximately positioned in the alignment of the filaments, such as a shoulder and/or a set of pins around which said filaments pass and are engaged. The term "positioned in the alignment of the filaments" means that the lashing members (pins, hooks, teeth, and/or crenellations, for example), which allow the filament to turn around the end fitting without any risk slipping, lie substantially in the surface of the cylindrical envelope in which the layer of filaments is inscribed, and do not depart significantly therefrom;

Said filaments are fastened on the end fittings by means of a bonding agent such as glue and or a resin wherein the filaments are embedded;

Said filaments present a thickness of less than 4 mm, and preferably lying in the range 0.5 mm to 1 mm;

Said filaments are made of synthetic material;

Said filaments are made of a plurality of nanometric fibers;

The winding angle of the filaments relative to generator lines, at least in the tubular pipe body, is about 55°;

The winding angle of the filaments relative to generator lines at the end fittings is greater than 54.7°, and advantageously lies in the range 56° to 65°, such that under the effect of an internal pressure inside the flexible pipe, the traction generated on the filaments tends to clamp the traction layers more tightly onto the end fittings, thereby improving or even ensuring sealing, as well as mechanical fastening on each end fitting, at this location;

The winding pitch of the array of filaments varies, being smaller at the end fittings than in the pipe body;

Said filaments are fastened on the end fittings by means of mechanical lashing members provided at their peripheries such as a shoulder and/or a set of pins, and said layer extends a little beyond said lashing members towards the ends of the pipe, the filaments being wound circumferentially or approximately circumferentially in said zones, in this case;

The group of filaments is advantageously wound around the end pieces at least over one half turn (for example over one to one-and-a-half turns) so that the force exerted on the filament decreases progressively towards the extremity of the end piece due to a "capstan" effect;

The flexible pipe includes a plurality of coaxial layers of filaments embedded in a wall of flexible and elastic material, e.g. of rubber.

In a preferred embodiment of the invention, the pipe includes a flexible cylindrical tubular pipe body connected at each of its ends to a rigid connector end fitting in the form of a sleeve. The wall of the pipe body includes, going radially from the inside towards the outside, a carcass, a liner of thermoplastic material or of elastomer, and a reinforcement layer made up of a plurality of coaxial traction layers built up of filaments of small thickness having high traction strength. These layers may be incorporated in a wall of flexible and elastic material, e.g. of rubber. The wall of the pipe further includes a protection cover of thermoplastic material or of elastomers, and it is characterized by the facts that firstly the filaments constituting each traction layer have a thickness of less than 4 mm and are wound helically about the longitudinal axis of the pipe at a varying pitch that is smaller in the region of the end fittings than in the pipe body, and secondly that said end fittings are provided at their peripheries with fastening means such as lashing members and/or a bonding agent. Each layer may comprise an array of uninterrupted filaments interconnecting the two end fittings in alternation in one direction and then in the other, while being fastened on them by means of said fastening means.

Advantageously, the winding angle of the filaments relative to generator lines in the pipe body is about 55°, whereas at the end fittings it lies in the range of 56° to 65°. Accordingly, under the effect of internal pressure inside the pipe, the traction generated on the filaments tends to clamp the traction layers onto the liner and onto the end fittings, thereby improving or ensuring sealing, as well as mechanical fastening on each end fitting, at this location.

BRIEF DESCRIPTION OF THE DRAWINGS

Other characteristics and advantages of the invention appear from the following description given with reference to the accompanying figures, in which.

DETAILED DESCRIPTION OF THE DRAWINGS

Figure 1:
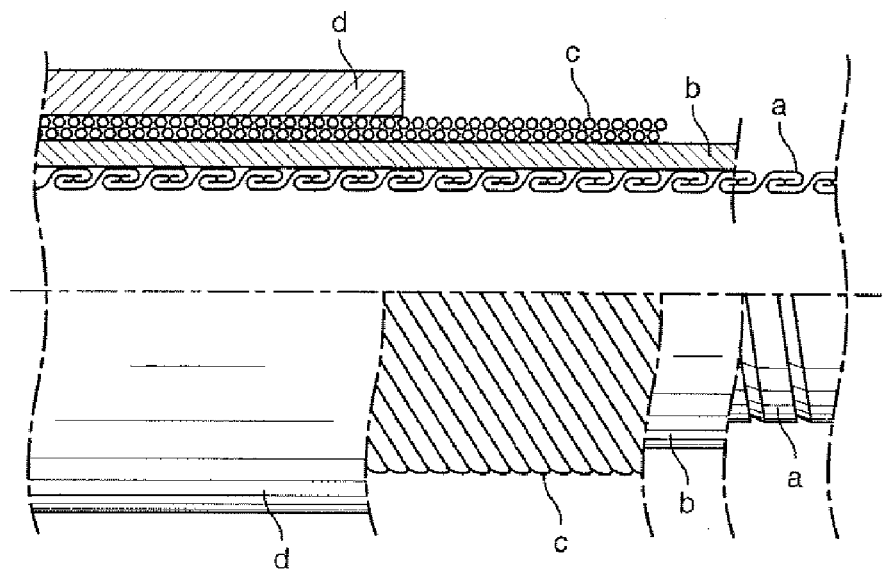
FIG. 1 is a diagram representative of the state of the art.
Figure 2:
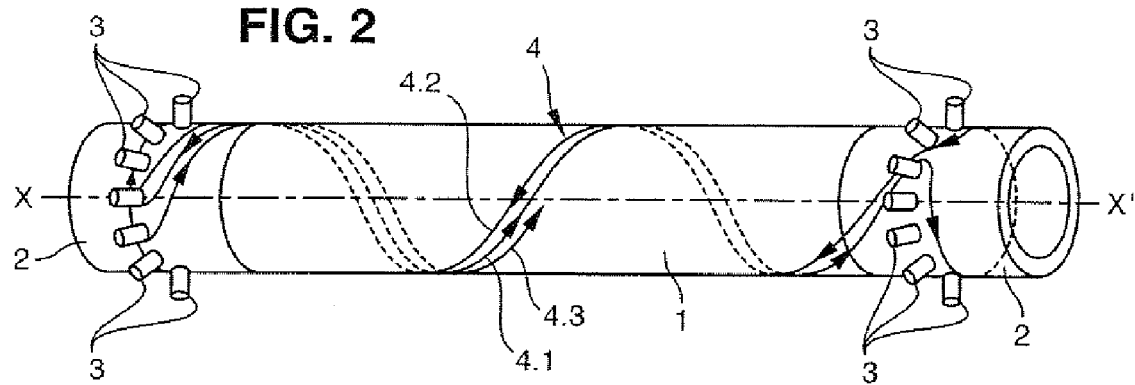
FIGS. 2 and 3 are diagrammatic perspective views showing two possible ways of winding a filament in order to make up a reinforcement layer.

FIG. 2 is a diagram showing the principle of the innovation. It shows the wall of the pipe body 1 of a flexible pipe that is secured to two end fittings 2 each in the form of a sleeve. Each end fitting 2 is provided with a plurality of lashing members disposed at its periphery. In the embodiment shown, these are short fingers or pins 3 disposed radially relative to the longitudinal axis X-X' of the pipe and angularly distributed in regular manner.

The figure shows a filament 4 constituting the reinforcement layer (or one of the traction layers) being wound around the cylindrical pipe body of the pipe and also on its ends. There can be seen a go strand 4.1, a return strand 4.2, and a new go strand 4.3 in the process of being wound.

The filament is laid continuously on the pipe body at a determined pitch. Each strand is wound helically and is adjacent to a previously laid strand. At each about-turn at an end of the pipe, the filament strand passes round a pin 3 and forms a loop lashing it to the pin, and so on until a traction layer has been built up. The free ends of the filament are attached to respective pins. This establishes a continuous connection between the pipe body and its end fittings.

In the diagram shown, the filament makes a complete turn at each end and changes its direction of rotation so as to be laid parallel to the previously-laid filament. The diagram shows only one filament being wound. Nevertheless, it is possible to wind a plurality of filaments in parallel without thereby going beyond the ambit of the invention.

Figure 3:
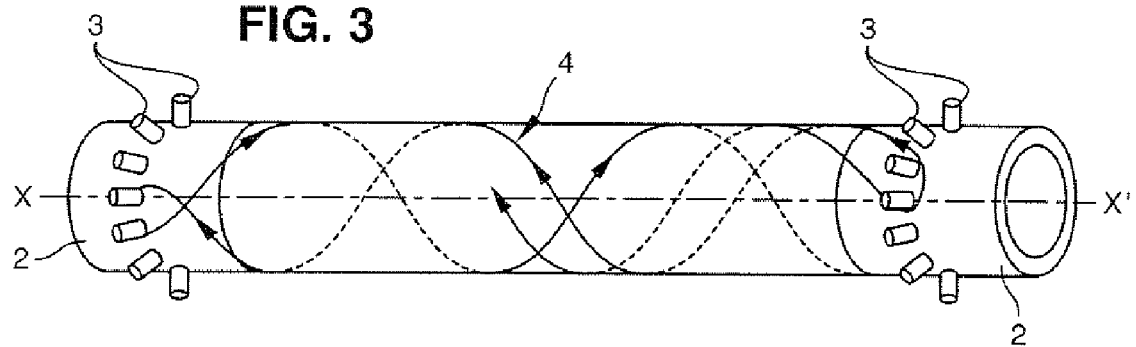

FIG. 3 is a diagram similar to that of FIG. 2, but in this diagram the filament 4 is laid without changing its direction of rotation, so it crosses over itself at regular intervals.

Figure 4:
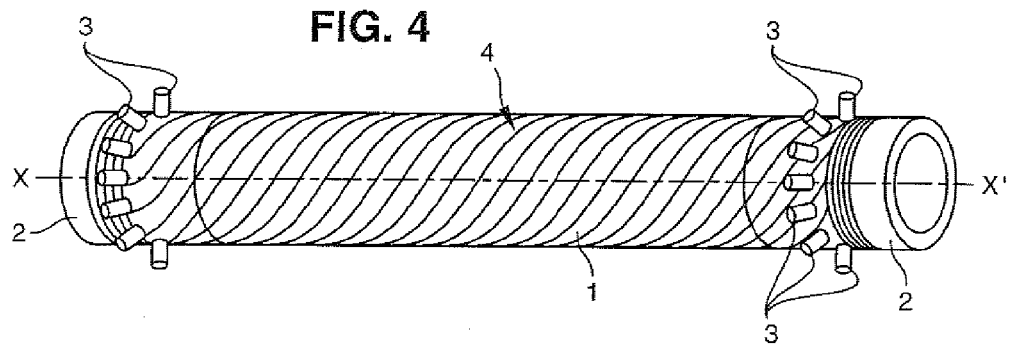
FIG. 4 is a similar diagram showing filament winding constituting a reinforcement layer and completely covering the surface of the flexible pipe.

FIG. 4 shows a filament winding constituting the reinforcement layer and covering the entire surface of the pipe.

Figure 5:
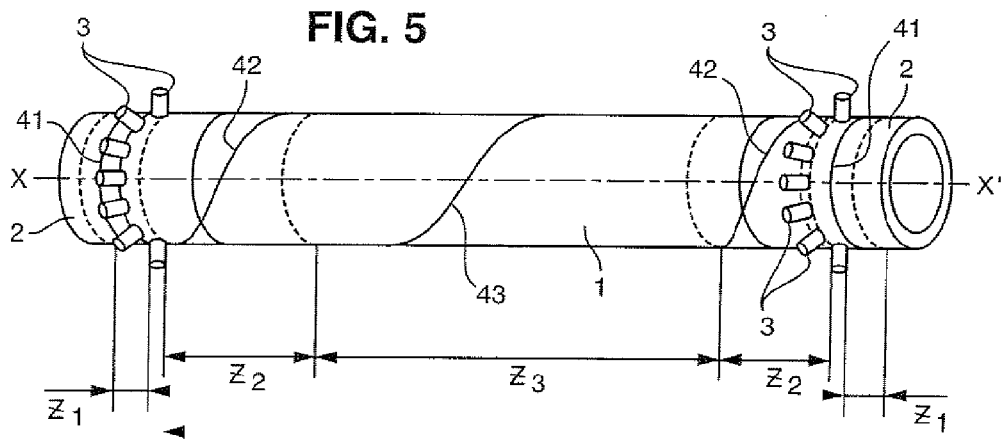
FIG. 5 is a similar diagram for use in explaining the particular winding of a traction layer constituted by a filament having winding pitches that differ depending on position along the axis of the flexible pipe.

FIG. 5 is highly diagrammatic and shows the particular winding of a traction layer constituted by one or more filaments presenting winding pitch that differs depending on position along the axis of the pipe. When one traction layer has been made, it is surrounded by a similar layer, but wound in the opposite direction, and so on. In the zone Z3, which corresponds to practically all of the pipe body 1, excepting its end zones in the vicinity of the end fittings 2, the filament(s) 43 is/are wound at an angle of 54.7° relative to the generator lines—and correspondingly to the axis X-X'—of the pipe body, so as to balance the circumferential and axial forces due to the internal pressure exerted inside the pipe. It is well known to the person skilled in the art that this value of 54.7° is an equilibrium value for the traction layer made up of filaments oriented in this way. It does not have any tendency to deform either in length or in diameter under the effect of internal pressure generated by a fluid under pressure present inside the pipe.

In the zones Z2 situated at the ends, the winding angle of the filament, referenced 42, changes progressively from the value of 54.7° to a larger value, e.g. 65°. This increase in angle serves to provide good sealing at the connection with the liner, as described below.

In the zones Z1 situated beyond the pins 3, between them and the ends, the winding pitch of the filament, referenced 41, passes to zero so as to go round the ends and continue winding around the body of the pipe.

Figure 6:
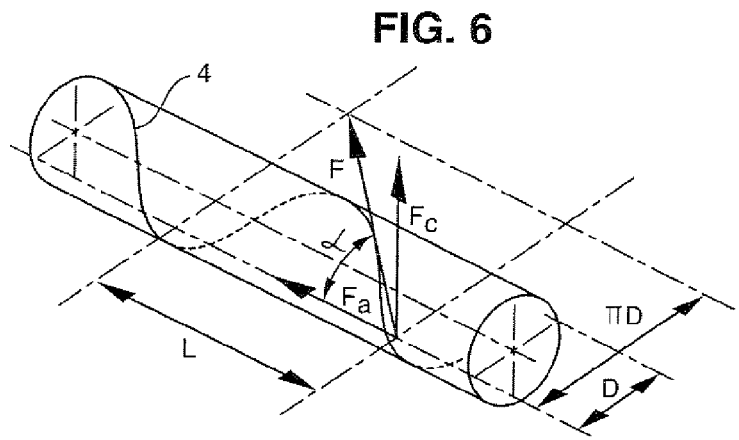
FIG. 6 is a diagram for use in explaining how to calculate the force exerted on a filament from the pressure inside the pipe and the laying angle of the filament.

FIG. 6 is a diagram for explaining how to calculate the force exerted on a filament from the pressure inside the pipe and the laying angle of the filament. For a helically-wound filament 4 of pitch L and of winding diameter D, Fa and Fc designate respectively the axial and the circumferential components of the force F exerted on the filament under the action of a pressure P inside the flexible pipe. α is the laying angle of the filament relative to the axis of the flexible pipe.

For a flexible pipe that is closed at its ends and that is subjected to an internal pressure applied over the same diameter as the winding diameter of the filament, the fibers become oriented at an equilibrium angle α relative to the axis of the pipe which satisfies the relationship:

$$\tan \alpha = \sqrt{2}$$

giving an angle of 54.7°. When the filaments are oriented at this equilibrium angle, the pipe is in equilibrium and does not deform whether in length or in diameter regardless of the pressure exerted inside the flexible pipe (naturally, within the limit set by the stresses that the materials can accept).

Figure 7:
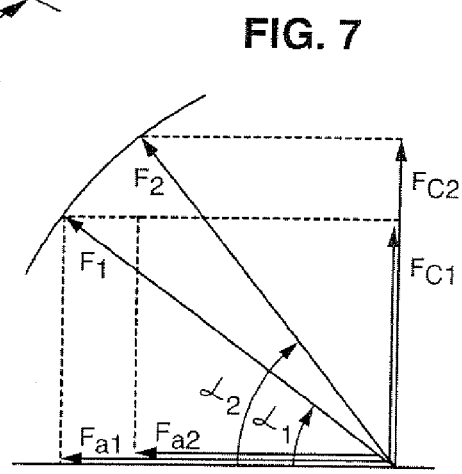
FIG. 7 is a projection onto a plane of the force F exerted on a filament laid at an angle α, this figure showing the influence of the laying angle.

FIG. 7 is a projection onto a plane of a force F1 and of a force F2 exerted on a filament laid at an angle α1 or α2 respectively. This figure shows the influence of the laying angle. When the laying angle of the filament increases so as to go from α1 to α2, the circumferential force increases going from Fc1 to Fc2. If these forces apply to a single filament, then the forces F1 and F2 have the same value but are oriented in different directions.

Under such circumstances, the forces Fc1 and Fc2 are related as follows:

$$Fc2=Fc1 \times \sin\alpha2/\sin\alpha1$$

In addition, the density of filaments relative to the axis X-X' of the pipe increases with increasing angle α.

The ratio of the density of fibers laid respectively at angles α1 and α2 is written $\Delta_{2/1}$, where this ratio is determined by the relationship:

$$\Delta_{2/1}=\cos\alpha1/\cos\alpha2$$

The ratio P2/P1 that represents the clamping ratio on the end of the zone Z2 is a function of the above two relationships, and is therefore as follows:

$$P2/P1=\sin\alpha2/\cos\alpha2 \times \cos\alpha1/\sin\alpha1=\tan\alpha2/\tan\alpha1$$

If the angle α1=54.7° and if the angle α2 varies as shown in the table below, then the ratios P2/P1 are as follows:

| α2 | P2/P1 |
|---|---|
| 54.7° | 1.00 |
| 58° | 1.13 |
| 60° | 1.22 |
| 65° | 1.51 |

The increase in the laying angle of the filaments thus increases the pressure exerted by said filament on the inside of the flexible pipe (increases in the ratio P2/P1 which is equivalent to clamping). This thus implements a self-clamping phenomenon that enables the sealing force (exercised by the reinforcement layer between the liner and the end fitting) to be increased when the pressure to be sealed increases.

Figure 8:
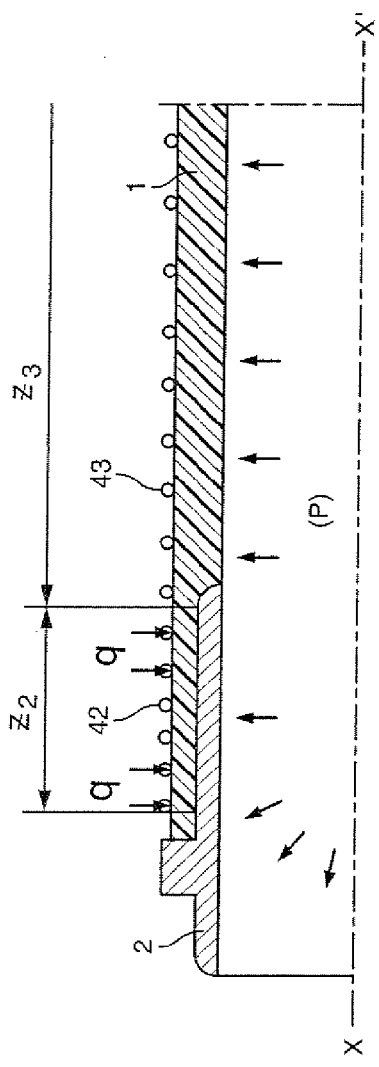
FIG. 8 is a diagrammatic half-view in section of one end of the flexible pipe, showing a filament of varying winding pitch.

This is shown in FIG. 8 which shows an end fitting of a pipe in accordance with the invention subjected to an internal pressure P. In the zone Z3, the filament laying angle is 54.7°. In this zone, the pipe is stable in shape. It does not increase in diameter nor does it shorten. The force Fc1 is balanced by the pressure P. This equilibrium is represented by the relationship:

$$Fc1=k \times P$$

where k is a constant. Fc1 is proportional to the pressure P.

In the zone Z2, the filament laying angle is 58°. The force Fc2 therein is greater than the force Fc1 by a ratio of 1.13. The force Fc2 thus applies radial pressure q on the liner given by:

$$q=0.13 \times P$$

For example, if the pressure in the pipe is 350 bars (35 MPa), then the pressure exerted in the zone Z2 by the structure of filaments laid at 58° on the interface between the liner and the end fitting is 0.13×350=45 bars by way of indication. This force is sufficient to maintain excellent sealing between the liner and the end fitting without having recourse to external means such as clamping rings and/or bonding. The more the pressure increases, the more firmly the connection between the liner and the end fitting is sealed.

Furthermore, with reference to FIG. 7, the value of the axial force passes from Fa1 to Fa2 when the angle passes from α1 to α2. The difference between these two values is taken up by the adherence of the filament of its support, for example on rubber, at its location on the end fitting. In addition, the force exerted on each filament decreases, due to the "capstan" effect, as soon as it is wound around on the end fitting. This effect is explained below.

Consider a filament that is helically wound on a cylindrical support, such as an end fitting 2. It is wound at an angle to the axis of the support, i.e. of the pipe body. It lies on a support material having a given coefficient of friction μ. β is the value of the winding angle around the axis X-X' of the end fitting.

Assume that a given traction force Ft is applied at one of the ends of the filament. For the filament to remain in a static state (without movement on its support), a resisting force Fr opposite to Ft must be exerted at its other end. Both forces Ft and Fr act in a direction that is tangential to the cylindrical body, forming an angle to its generator line. The equilibrium of the filament is represented by the relationship:

$$Fr=Ft/e^{\mu\beta},$$

where "e" is the base of natural logarithms (e=2.718282).

For example, if the filament is wound through one-and-a-half turns around the body, β=3π. If it is assumed that the body is covered in rubber, having a coefficient of friction μ=0.8, then:

$$Fr=Ft/e^{0.8 \times 3\pi} \approx Ft/1,900$$

which means that the force Fr is smaller than the force Fr by a factor of 1,900.

By way of indication, if this rule is applied to a flexible pipe having a diameter of 100 millimeters and subjected to an internal pressure of 700 bars (70 Mpa), the traction force exerted on the filaments in the pipe body as a whole is 96,000 decanewtons (daN). At the entry of each end fitting, the force is only of 50 decanewtons (daN) after winding through one-and-a-half turns around the end fitting.

In conclusion, the force exerted by the array of filaments on the lashing members is significantly reduced by the "capstan effect" applied to the filaments wound on the end fittings.

Figure 10:
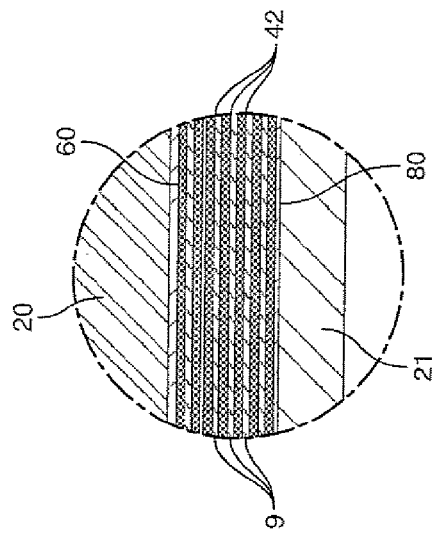
FIG. 10 is a view on a larger scale of the detail in the circle referenced A in FIG. 9.
Figure 9:
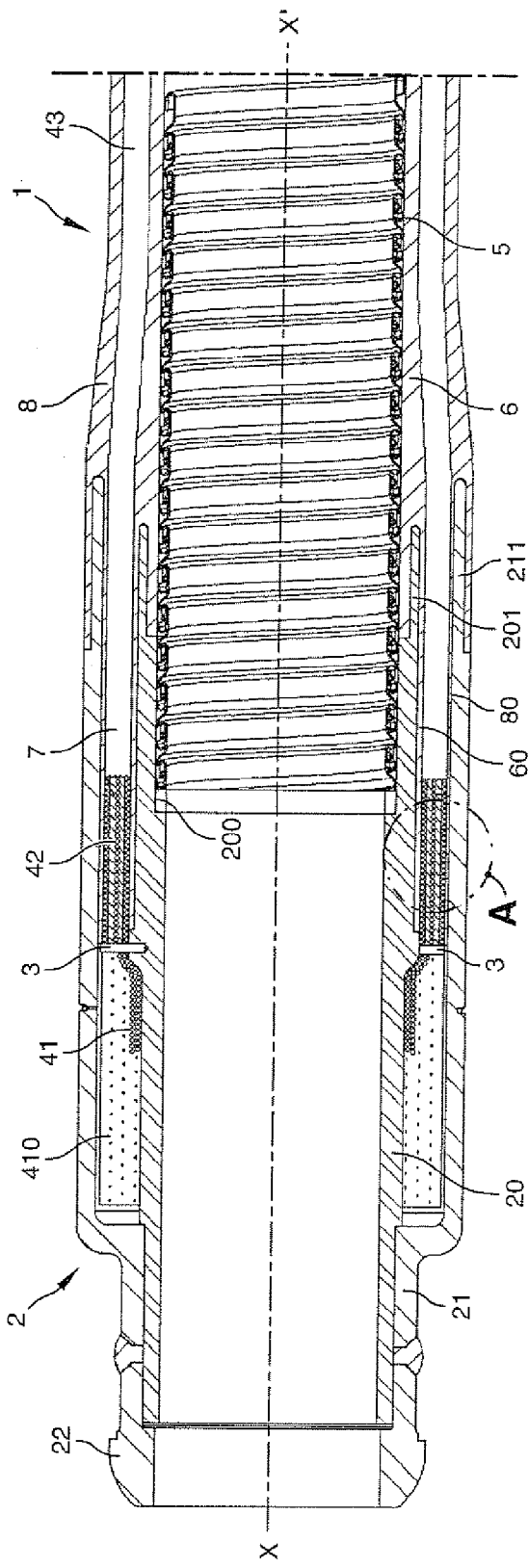
FIG. 9 is an axial section view of one of the end portions of a flexible pipe in accordance with the invention.

FIGS. 9 and 10 show one of the end fittings of a varying pitch flexible pipe designed in the manner described above. The end fitting 2 comprises an internal portion or insert 20 covered by an external portion 21 forming a protective shell, and a male connection member 22 that is fitted on and secured by welding. This member presents a standardized profile enabling it to be connected to a complementary female end fitting. These elements are made of metal, as is the carcass referenced 5.

Reference 7 designates the reinforcement layer which is embedded in the wall of the pipe body 1 of the flexible pipe, and is made up of a set of layers of filaments as described above. The reinforcement layer 7 is interposed between a liner 6 and an outer protective cover 8, both made of thermoplastic material or of elastomer. The carcass 5, the liner 6, the reinforcement layer 7, and the cover 8 are preferably bonded to one another.

The end portion of the carcass 5 is bonded in an internal setback 200 in the wall of the insert 20 so that the fluid flow diameter is constant through the connection zone between the pipe body 1 and the end fitting.

The end zones of the liner 6 and the cover 8 are overmolded onto appropriate thin annular connection regions 201 and 211 respectively of the portions 20 and 21 of the end fitting 2, covering said annular regions. The liner 6 and the cover 8 are extended in the end fitting 2 by respective thin annular zones 60 and 80 constituting coverings respectively around the outside wall of the insert 20 and around the inside wall of the shell 21. These coverings extend practically as far as the annular series of lashing pins 3.

The various coaxial layers of filaments 43, 42, both in the pipe body and in the transition zone with the end fitting 2 (as far as the pins 3), are separated by layers of rubber 9 (see FIG. 10). The winding directions of the filaments in two adjacent layers are preferably reversed. This multilayer reinforcing structure is sandwiched between the liner 6 and the outer protective cover 8. In the transition zone with the end fitting 2, it is interposed between the coverings 60 and 80 mentioned above. Beyond the pins 3, the filaments 41 form circumferential windings that may also be covered by an additional winding of fibers 410, possibly having a mass of plastics or resin material overmolded thereon. A similar configuration is naturally provided at the other end of the pipe.

Mere observation of FIG. 9 shows that the diameter of the pipe in its end regions, level with the connection end fittings, is only slightly greater than its diameter in the pipe body. This remarkable compactness is associated in particular with the fact that the lashing pins are disposed radially relative to the axis X-X' and project over a limited length only (substantially equal to the thickness of the reinforcement layer) out from the insert 20. The filaments are lashed merely by being passed around the pins, and they are moved away from the cylindrical envelope in which the layer lies very little, if at all.

It can be observed on the FIG. 9 that beyond the annular zone provided with the pins 3, the portion 20 of the end fitting 2 has an outer diameter slightly smaller that the diameter of said annular zone. In this way, the transition zone between these zones constitutes a shoulder suitable for retaining—or for contributing to retaining—the circumferential windings on portion 20. Since this zone is of reduced diameter, the presence of the windings of filaments 41 and of the surrounding fibers 410 does not affect the radial compactness of the end fitting.

The number and the dimensions of the pins 3 are naturally selected as a function of the characteristics required by the pipe, and in particular of the diameter of the filaments and the number of sheets implemented. The lashing members are not necessarily pins, nor are they necessarily cylindrical fingers; for example they could be constituted by hooks, teeth, and/or crenellations, in particular. Instead of having only one set of pins (or similar lashing members) disposed in a single transverse plane, it would naturally be possible to provide a plurality of similar sets, e.g. two or three sets that are offset a little in the axial direction.

As explained above, the force exerted by the filaments on the lashing members is very low because of the "capstan effect". That is why said lashing members may have small dimensions. In fact, the lashing members are especially useful for guiding the filaments while they are being wound, during manufacturing of the flexible pipe. Once they have been suitably wound they may be simply fastened on the end fittings by means of glue, by embedding in resin or another bonding agent or by other means such as crimping.

The lashing means, such as the pins 3 could be removable. For example, they could be inserted without play into radial receiving holes pierced in the end fitting before the manufacturing of the pipe, in order to facilitate the winding of the filament(s), and removed after the operations of winding and bonding (for example by gluing) the filament(s) on the end fittings. The filaments could even be severed at their locations on the end fittings, since the presence of the bonding means is sufficient to retain them and avoid slipping on the end fittings.

The filaments may be circular in section, but that is not essential. They are made of a material presenting high traction strength. As suitable materials, mention can be made of synthetic materials, in particular aramid, and also carbon, glass, and steel. This includes nanometric fibers (for example carbon nanotubes). The filaments must be sufficiently fine and flexible to be capable of going round the lashing members, pins or other members, if any, as closely as possible, and to accept winding with varying pitch.

The invention claimed is:

1. A flexible pipe comprising:
   a flexible cylindrical tubular pipe body having a first end and a second end respectively connected to first and second rigid connector end fittings in the form of a sleeve, the wall of the pipe body being mechanically reinforced by at least one layer of filaments of small thickness presenting high traction strength, the filaments being wound helically about the longitudinal axis of the pipe;
   wherein the at least one layer of filaments includes an array of uninterrupted filaments interconnecting the first and second end fittings alternately in one direction and then in the other direction, while being fastened on the first and second end fittings;
   wherein the filaments are fastened on the first and second end fittings by mechanical lashing members provided at their peripheries, wherein the mechanical lashing members include one of a shoulder or a set of pins around which the filaments pass and are engaged;
   a cylindrical envelope in which the at least one layer of filaments lie, wherein the lashing of the at least one layer of the filaments is made so as to prevent the filaments from moving away from the cylindrical envelope, making the at least one layer of filaments a traction layer; and
   wherein the at least one layer of filaments have a winding angle relative to the first and second end fittings that is greater than 54.7°, such that an internal pressure within the flexible pipe will cause the traction layer to clamp more tightly onto the first and second end fittings.

2. A flexible pipe according to claim 1, wherein the filaments are fastened on the first and second end fittings by means of a bonding agent such as glue or a resin in which the filaments are embedded.

3. A flexible pipe according to claim 1, wherein the filaments present a thickness of less than 4 mm.

4. A flexible pipe according to claim 1, wherein the filaments are made of synthetic material.

5. A flexible pipe according to claim 1, wherein the filaments are made of a plurality of nano-metric fibers.

6. A flexible pipe according to claim 1, wherein the winding angle of the filaments relative to the longitudinal axis of the pipe is about 55°.

7. A flexible pipe according to claim 1 wherein the winding pitch of the filaments varies from smaller at the first and second end fittings to larger at the pipe body.

8. A flexible pipe according to claim 7, wherein the filaments are fastened on the first and second end fittings so that the filaments extend beyond the mechanical lashing members towards the first and second ends of the pipe, the filaments being wound circumferentially or approximately circumferentially around the pipe.

9. A flexible pipe according to claim 1, wherein the filaments are embedded in a wall of flexible and elastic material such as rubber.

10. A flexible pipe comprising:
    a flexible cylindrical tubular pipe body having first and second ends respectively connected to first and second rigid connector end fittings in the form of a sleeve, the wall of the pipe body including, going radially from the inside towards the outside:
    a) a carcass;
    b) a liner of thermoplastic material or of elastomer;

c) at least one reinforcement layer comprising a plurality of coaxial traction layers built up of filaments of small thickness having high traction strength, the traction layers being incorporated in a wall of flexible and elastic material such as rubber; and d) a protection cover of thermoplastic material or of elastomer;

wherein the filaments of each traction layer have a thickness of less than 4 mm and are wound helically about the longitudinal axis of the pipe at a varying pitch that is smaller in the region of the first and second end fittings than in the pipe body, and wherein the end fittings are provided at their peripheries with fastening mechanisms such as lashing members or a bonding agent, each traction layer composed of an array of uninterrupted filaments interconnecting the first and second end fittings in alternation in one direction and then in the other, while being fastened to them by means of the fastening mechanism.

11. A flexible pipe according to claim 10, wherein the winding angle of the filaments relative to the longitudinal axis of the pipe body is about 55°, and the winding angle of the filaments at the end fittings is 56° to 65°, such that under the effect of internal pressure inside the pipe, the filaments clamp the traction layers more tightly onto the first and second end fittings, thereby sealing an interface between the traction layers and the first and second end fittings.

12. A flexible pipe according to claim 3, wherein the filaments present a thickness in the range 0.5 mm to 1 mm.

* * * * *